Sept. 22, 1964     E. A. FALKNER     3,149,606
ACCELEROMETERS
Filed May 13, 1963
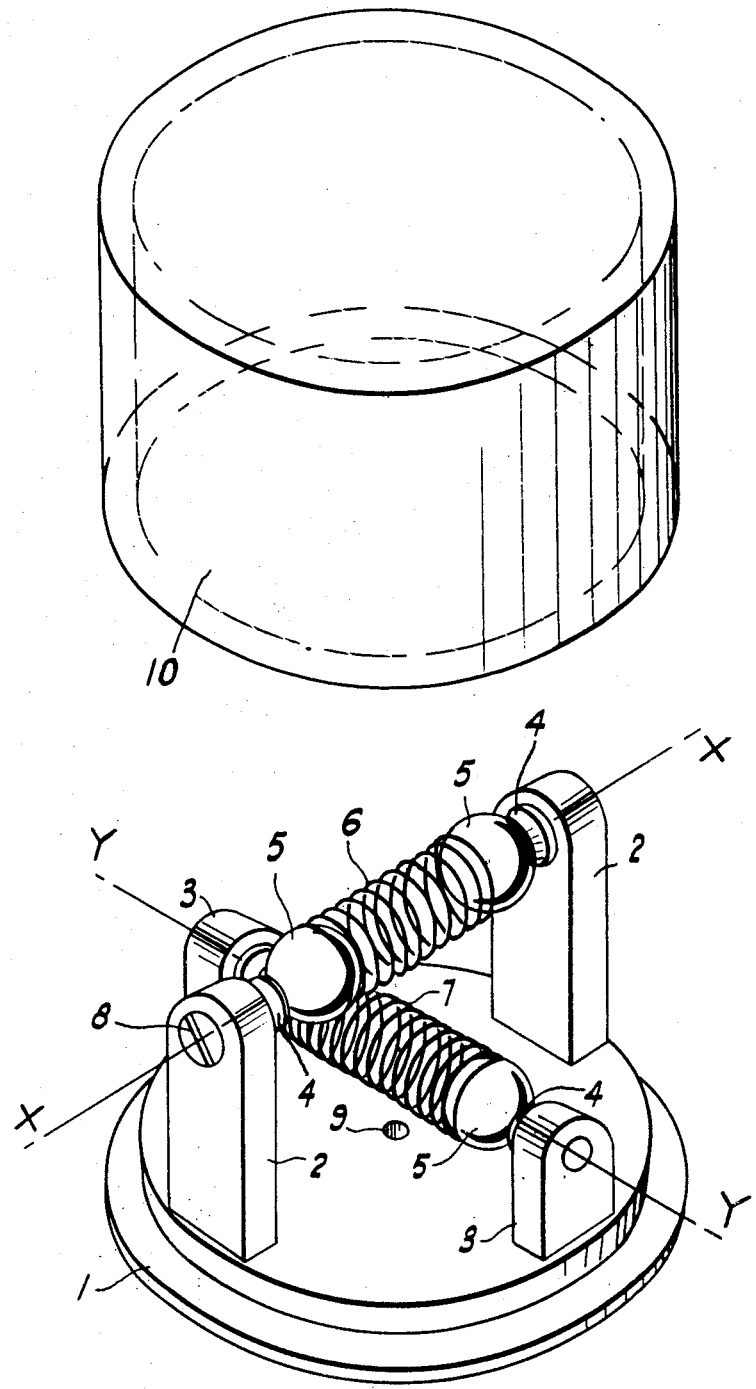

United States Patent Office 3,149,606
Patented Sept. 22, 1964

3,149,606
ACCELEROMETERS
Eric Arthur Falkner, Isleworth, Middlesex, England, assignor to The Hairlok Company Limited, London, England
Filed May 13, 1963, Ser. No. 279,747
Claims priority, application Great Britain May 17, 1962
6 Claims. (Cl. 116—114)

This invention relates to accelerometers and provides a simple device which indicates when it has been subjected to a shock force of more than a given value. Such a device is particularly, though not exclusively, useful for showing whether cargo has been subjected to excessive shock during transit or handling.

According to the invention, an accelerometer, or shock-indicating device, comprises at least two weights which, along different axes as between one weight and another, are spring-loaded against supports so that a non-axial acceleration of more than a given value will displace a respective weight from its support and the consequent position of the weight will show that the given acceleration has been exceeded.

Preferably, the weights are metal balls, the springs are helical compression springs and the supports are cup sockets of such shape and size that the balls will be dislodged, and fall from the sockets, by a given shock.

The axes of the springs are preferably mutually at rightangles so that a shock in any direction will have a lateral component on at least one of the balls.

Preferably also, the ball and socket arrangement is duplicated at either end of each of two springs in perpendicularly intersecting planes, this providing a simple arrangement of which the inertia can be accurately determined as compared with, for example, an anchored or tethered spring arrangement.

A preferred example of the invention is shown in perspective view by the accompanying drawing.

As shown, the device comprises a base plate 1 from which upstand two pairs of pillars 2 and 3, the pillars 2 being higher than the pillars 3.

On the inner face of each pillar, near the top, is a cup socket 4 in which rests a ball 5 held by one of two helical compression springs 6 and 7, each spring being compressed between and holding in place a pair of balls in the sockets of a pair of pillars along the axes X—X and Y—Y respectively.

The wall of the rim of each socket 4 is externally tapered so that the respective ball rests against a relatively narrow rim and, if sufficiently dislodged laterally from axial seating in the socket, will escape past the rim and fall rather than re-seat.

One of the cup sockets of each pair is mounted by its stem in screwthreaded engagement with its respective pillar and the stem has a screw slot 8 so that it can be turned to adjust the spacing apart of the respective pair of sockets and thus to adjust the compression of the respective spring.

The weight and diameter of the balls, the depth and diameter of the sockets, the radial dimension of the socket rims and the strength and adjustment of the compression of the springs are selected so that the device will withstand up to a given acceleration, which may be positive or negative, without the balls escaping from their seats under the effect of their inertia and against their spring-loading.

The device can be used by being secured, such as by a screw through the central hole 9 in the base plate 1, on or in the container of a cargo, such as a relatively delicate machine or apparatus, for which it is important to know whether or not it has been subjected to excessive shock in transit or handling. Inspection of the device, to see whether the balls are still in place, will show this at any time.

The device is enclosed by a transparent cover shown, in raised position, as an inverted cup 10, of transparent polystyrene or other plastics, to safeguard against disturbance of the balls by direct impact and also to retain the balls and springs which drop free if dislodged.

I claim:
1. A shock-indicating device comprising a base, a first pair of cup sockets on said base and spaced apart mutually opposed along a first axis, a second pair of cup sockets on said base and spaced apart mutually opposed along a second axis in a plane perpendicularly intersecting the plane of said first axis, four balls each seated in a respective one of said cup sockets, and two helical compression springs of which one spring extends along said first axis in compression between the respective two balls in said first pair of cup sockets and the other spring extends along said second axis in compression between the respective two balls in said second pair of cup sockets.

2. A shock-indicating device as claimed in claim 1 and means for adjusting the spacing apart of the cup sockets respectively of each said pair of cup sockets.

3. A shock-indicating device as claimed in claim 1, four pillars on said base, each of said cup sockets being mounted on a respective one of said pillars and at least one of each said pair of cup sockets being in screwthreaded engagement with the respective one of said pillars and constituting said adjusting means.

4. A shock-indicating device as claimed in claim 1, in which each said cup socket has a wall which is externally tapered towards the respective ball seated therein.

5. A shock-indicating device as claimed in claim 1 and a transparent cover removably mounted on said base and enclosing said cup sockets, balls and springs.

6. An accelerometer or shock indicating device comprising a base, at least two cup sockets on said base, at least two balls respectively engaged with a respective one of said cup sockets, at least two helical compression springs each thrusting a respective ball into its respective cup socket along different axes as between one and another of said balls, and respective means for adjusting the compression of each helical compression sprign.

References Cited in the file of this patent
UNITED STATES PATENTS

| | | |
|---|---|---|
| 2,056,494 | Tucker et al. | Oct. 6, 1936 |
| 2,475,728 | Smith | July 12, 1949 |
| 2,679,819 | Torcheux | June 1, 1954 |
| 2,835,759 | Waldow | May 20, 1958 |
| 2,912,534 | Rowell et al. | Nov. 10, 1959 |

UNITED STATES PATENT OFFICE
CERTIFICATE OF CORRECTION

Patent No. 3,149,606                  September 22, 1964

Eric Arthur Falkner

It is hereby certified that error appears in the above numbered patent requiring correction and that the said Letters Patent should read as corrected below.

Column 2, line 33, for the claim reference numeral "1" read -- 2 --.

Signed and sealed this 20th day of April 1965.

(SEAL)
Attest:

ERNEST W. SWIDER
Attesting Officer

EDWARD J. BRENNER
Commissioner of Patents